US010882562B2

(12) United States Patent
Tanaka

(10) Patent No.: US 10,882,562 B2
(45) Date of Patent: Jan. 5, 2021

(54) PILLAR UPPER STRUCTURE

(71) Applicant: TOYOTA JIDOSHA KABUSHIKI KAISHA, Toyota (JP)

(72) Inventor: Ryusuke Tanaka, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 38 days.

(21) Appl. No.: 16/281,492

(22) Filed: Feb. 21, 2019

(65) Prior Publication Data

US 2019/0276087 A1    Sep. 12, 2019

(30) Foreign Application Priority Data

Mar. 8, 2018 (JP) ................ 2018-042350

(51) Int. Cl.
*B62D 25/04* (2006.01)
*B62D 21/15* (2006.01)
*B62D 25/06* (2006.01)

(52) U.S. Cl.
CPC .......... *B62D 25/04* (2013.01); *B62D 21/157* (2013.01); *B62D 25/06* (2013.01)

(58) Field of Classification Search
CPC ...... B62D 25/04; B62D 25/06; B62D 25/025; B62D 27/023; B62D 25/02; B62D 25/082; B62D 21/157; B62D 29/007
USPC .... 296/193.06, 193.05, 193.01, 203.03, 209, 296/210, 70, 205, 204; 29/897.2, 428, 29/401.1, 525.11, 592.1
See application file for complete search history.

(56) References Cited

U.S. PATENT DOCUMENTS

| 8,215,708 | B2* | 7/2012 | Gruneklee | B62D 25/06 296/187.12 |
| 9,156,505 | B2* | 10/2015 | Yao | B62D 25/04 |
| 9,643,655 | B2* | 5/2017 | Saito | B62D 25/04 |
| 2003/0141747 | A1 | 7/2003 | Honma et al. | |
| 2012/0161475 | A1* | 6/2012 | Mori | B62D 21/152 296/193.06 |
| 2013/0300155 | A1* | 11/2013 | Kurokawa | B62D 25/06 296/193.06 |
| 2014/0306478 | A1* | 10/2014 | Yao | B62D 27/023 296/29 |
| 2016/0107701 | A1* | 4/2016 | Anegawa | B62D 25/04 296/193.06 |

(Continued)

FOREIGN PATENT DOCUMENTS

JP    2003-212148 A    7/2003
JP    2016-68708 A    5/2016

*Primary Examiner* — D Glenn Dayoan
*Assistant Examiner* — Sunsurraye Westbrook
(74) *Attorney, Agent, or Firm* — Oliff PLC

(57) ABSTRACT

A roof side rail inner member and a roof side rail outer member of a roof side rail are coupled to each other in a first coupling portion. The roof side rail and a center pillar are coupled to each other in a second coupling portion. A bulkhead is coupled to the roof side rail outer member in a third coupling portion in a space within the roof side rail. The bulkhead is coupled to the roof side rail inner member in a fourth coupling portion. The roof side rail inner member and the roof side reinforcement are coupled to each other in a fifth coupling portion below the first coupling portion. The second, third, fourth, and fifth coupling portions together form a route along which impulsive force exerted to the center pillar is transmitted to the roof side reinforcement.

8 Claims, 6 Drawing Sheets

(56) References Cited

U.S. PATENT DOCUMENTS

2017/0305469 A1\* 10/2017 Iyoshi .................. B62D 27/023

\* cited by examiner

US 10,882,562 B2

PILLAR UPPER STRUCTURE

CROSS REFERENCE TO RELATED APPLICATION

This application claims priority to Japanese Patent Application No. 2018-042350 filed on Mar. 8, 2018, which is incorporated herein by reference in its entirety including the specification, claims, drawings, and abstract.

TECHNICAL FIELD

The present disclosure relates to a pillar upper structure configured to protect a vehicle body against side impact from a lateral side of a vehicle body.

BACKGROUND

A body upper structure of a vehicle is composed of roof side rails each including a roof side rail outer member and a roof side rail inner member welded together at a weld on a roof side end, center pillars each coupled to the roof side rail outer member of the corresponding roof side rail at a lateral side of the body, and roof side reinforcements each coupled to the roof side rail inner member of the corresponding roof side rail on the body roof. See JP 2003-212148 A and JP 2016-068708 A, for example.

SUMMARY

In the body upper structure described above, impulsive force generated by side impact on the vehicle body is transmitted from the center pillar to the side rail outer member and is further exerted to a weld of the roof side rail outer member and the roof side rail inner member. This results in breaking of the roof side rail inner member at the weld. Further, the roof side reinforcement causes the roof side rail inner member to be collapsed outward of the vehicle body, causing cross-section crumbling of the roof side rail, which significantly destructs the roof side rail.

In an aspect of the disclosure, a pillar upper structure includes a roof side rail extending along a length of a vehicle body on each end in a vehicle width direction of a body upper portion and including a roof side rail inner member disposed inward in the vehicle width direction and a roof side rail outer member disposed outward in the vehicle width direction, a center pillar extending along a height of the vehicle body on each lateral side of the vehicle body, a bulkhead disposed in a space formed by the roof side rail inner member and the roof side rail outer member, and a roof side reinforcement. An upper end portion of the roof side rail inner member and an upper end portion of the roof side rail outer member are coupled with each other in a first coupling portion. The center pillar is coupled with the roof side rail outer member in a second coupling portion. The bulkhead is coupled with the roof side rail outer member in a third coupling portion and coupled with the roof side rail inner member in a fourth coupling portion. The roof side reinforcement is coupled with the roof side rail inner member in a fifth coupling portion that is below the first coupling portion. The second coupling portion, the third coupling portion, the fourth coupling portion, and the fifth coupling portion form a route along which impulsive force exerted to the center pillar is transmitted to the roof side reinforcement.

This structure prevents breaking of the roof side rail inner member in the first coupling portion, thereby inhibiting destruction of the roof side rail.

In the above pillar upper structure, the bulkhead may have an uneven shape including concave portions and convex portions along the vehicle width direction, or a waveform shape.

This structure efficiently transmits the impulsive force from the center pillar to the roof side reinforcement.

In the above pillar upper structure, the bulkhead may be coupled with the roof side rail outer member in the third coupling portion at a plurality of locations and coupled with the roof side rail inner member in the fourth coupling portion at a plurality of locations. The number of locations of the fourth coupling portion may be smaller than the number of locations of the third coupling portion.

This structure efficiently transmits the impulsive force from the center pillar to the roof side reinforcement in a concentrated manner.

The pillar upper structure of the disclosure having the above structure may guide the impulsive force caused by side impact of a vehicle, from the center pillar, via the bulkhead disposed within a space formed by the roof side rail inner member and the roof side rail outer member (that is, via the second coupling portion, the third coupling portion, the fourth coupling portion, and the fifth coupling portion), toward the roof side reinforcement. This structure may therefore reduce impulsive force to be transmitted to the first coupling portion, which is a weld between the roof side rail outer member and the roof side rail inner member, to prevent breaking of the roof side rail inner member in the first coupling portion. This structure further inhibits destruction of the roof side rail.

BRIEF DESCRIPTION OF THE DRAWINGS

Embodiments of the present disclosure will be described by reference to the following figures, wherein.

DESCRIPTION OF EMBODIMENTS

Related Art Pillar Upper Structure

Figure 1:
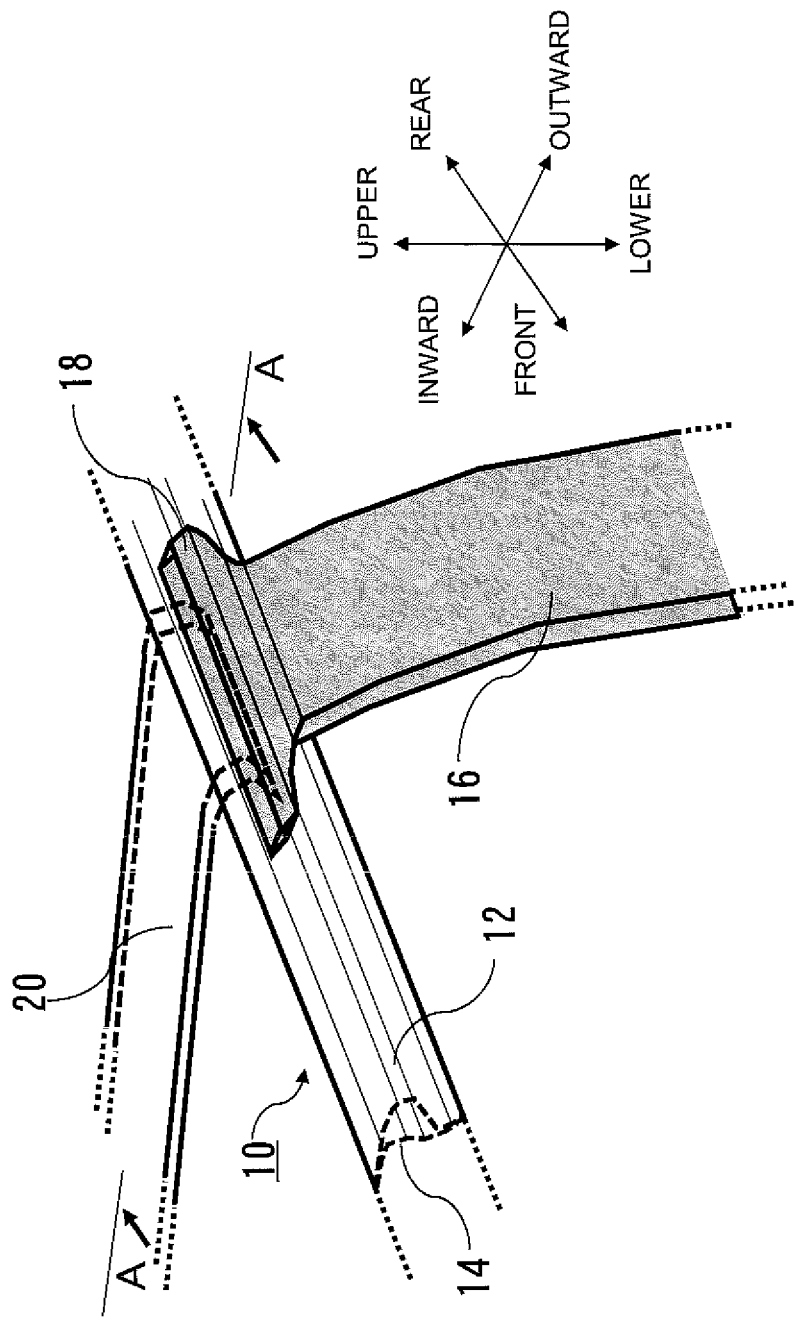
FIG. 1 is a perspective view of an outer appearance of a related art pillar upper structure.

A pillar upper structure of related art will be described with reference to FIG. 1. In FIGS. 1 to 6, the terms "inward" and "outward" refer to inward and outward of a vehicle along the vehicle width, the terms "upper" and "lower" refer to upper and lower sides of a vehicle along the vehicle height, and, the terms "front" and "rear" refer to the front and rear of a vehicle along the vehicle length.

Referring to FIG. 1, a roof side rail 10 is disposed on each lateral end of a roof of a vehicle body to extend across the body from the front over to the rear of the body. The roof side rail 10 includes a roof side rail outer member 12 located outward of the body and a roof side rail inner member 14 located inward of the body, which are coupled together.

A center pillar 16 includes an upper end 18 that is coupled to the roof side rail outer member 12.

A roof side reinforcement 20 reinforces a roof member (not shown) of the body in the vehicle width direction, and has one end in the vehicle width direction coupled to the roof side rail inner member 14.

Detailed Cross Section of Related Art Pillar Upper Structure

Figure 2:
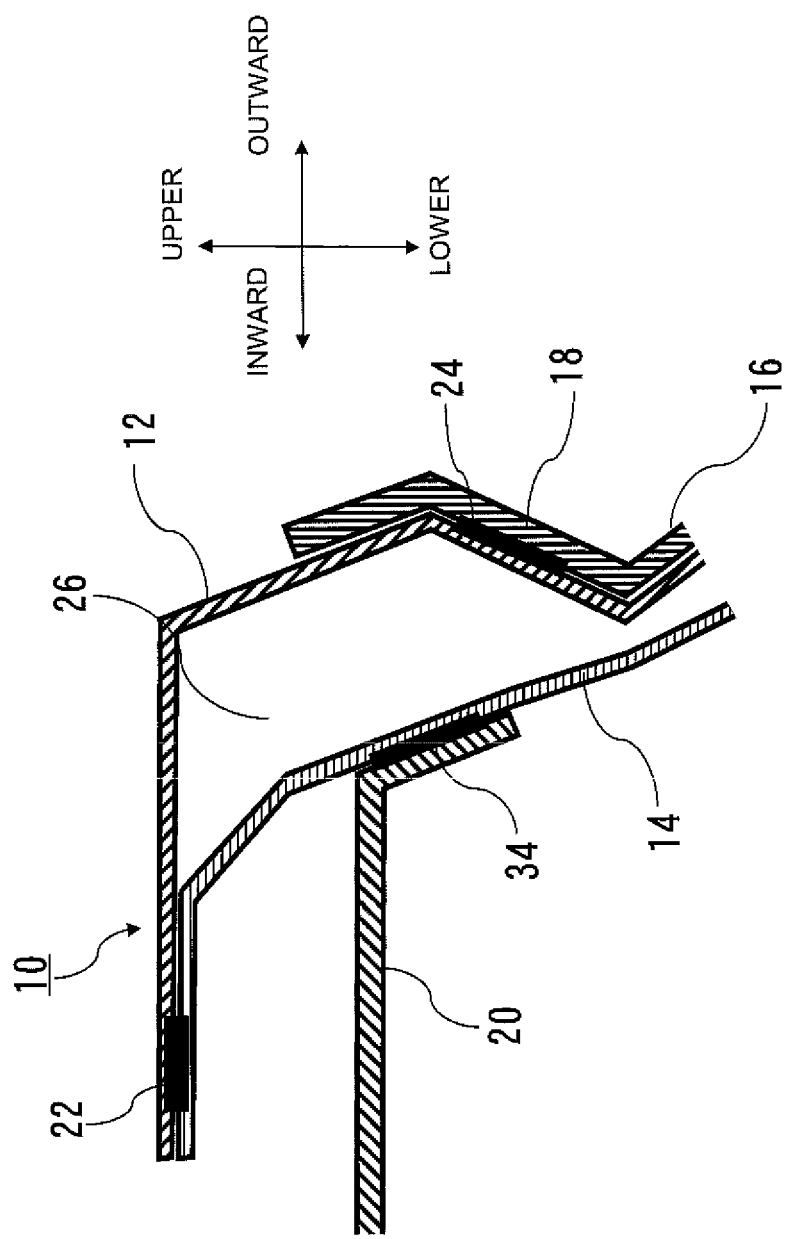
FIG. 2 is a cross sectional view taken along line A-A of the related art pillar upper structure illustrated in FIG. 1.
Figure 3:
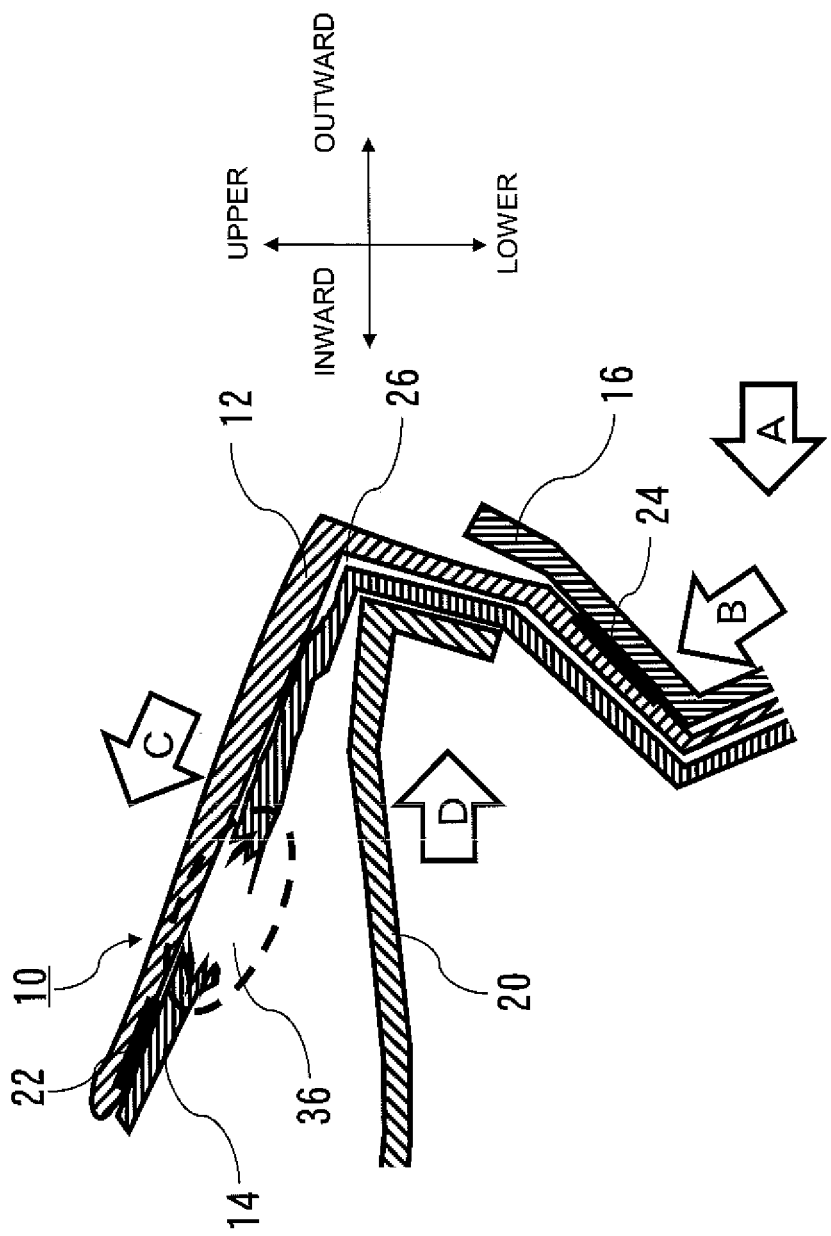
FIG. 3 illustrates deformation of a cross section illustrated in FIG. 2 caused by external impact on the related art pillar upper structure illustrated in FIG. 1.

Referring to FIGS. 2 and 3, the related art pillar upper structure will be described in detail.

FIG. 2 is a cross section taken along line A-A of FIG. 1 for explaining the related art pillar upper structure.

In FIG. 2, the roof side rail outer member 12 and the roof side rail inner member 14 of the roof side rail 10 are coupled together at least in a first coupling portion 22 in respective upper end portions.

The roof side rail outer member 12 and the roof side rail inner member 14 form a space 26. While FIG. 2 illustrates the roof side rail outer member 12 and the roof side rail inner member 14 that are coupled only in the first coupling portion 22 with their lower end portions being opened, they may also be coupled at their lower end portions to thereby form a closed space 26.

The center pillar 16 includes the upper end portion 18 coupled to the roof side rail outer member 12 in a second coupling portion 24.

The roof side reinforcement 20 has one end in the vehicle width direction coupled to the roof side rail inner member 14 in a fifth coupling portion 34.

Example Deformation of Related Art Pillar Upper Structure on Impact

Referring now to FIG. 3, example deformation of the related art pillar upper structure illustrated in FIG. 2 upon impact from outside the vehicle body will be described FIG. 3 illustrates example deformation of the pillar upper structure illustrated in FIG. 2 on impact from outside of the vehicle body.

In FIG. 3, impulsive force in the direction of arrow A from outside of the vehicle body is transmitted through the center pillar 16 in the direction of arrow B, and is then transmitted, via the second coupling portion 24, through the inside of the roof side rail outer member 12. The impulsive force then directly reaches the first coupling portion 22, which is a coupling portion of the roof side rail outer member 12 and the roof side rail inner member 14, as indicated by arrow C.

Thus, strong force in the direction of arrow C is exerted against the upper end portion of the roof side rail outer member 12, whereas reaction in the direction of arrow D is exerted against the roof side rail inner member 14 by the roof side reinforcement 20.

More specifically, strong impulsive force in the direction of arrow C acts on the roof side rail outer member 12 at the first coupling portion 22. Simultaneously, strong force in the direction of arrow D which is opposite the direction of arrow C is instantly applied to the roof side rail inner member 14.

This causes the roof side rail inner member 14 to be broken in a range (a break portion 36) enclosed by a dotted line.

The roof side rail inner member 14 which is broken is further urged in the direction of arrow D by the roof side reinforcement 20 into deformation and cross-section crumbling, collapsing the space 26 formed by the roof side rail outer member 12 and the roof side rail inner member 14.

The roof side reinforcement 20 urges the roof side rail inner member 14 which is broken and the roof side rail outer member 12 further outward of the vehicle body. This causes the whole roof side rail 10 and the center pillar 16 to be largely deformed outward of the vehicle body and destroyed.

Pillar Upper Structure of First Embodiment

Figure 4:
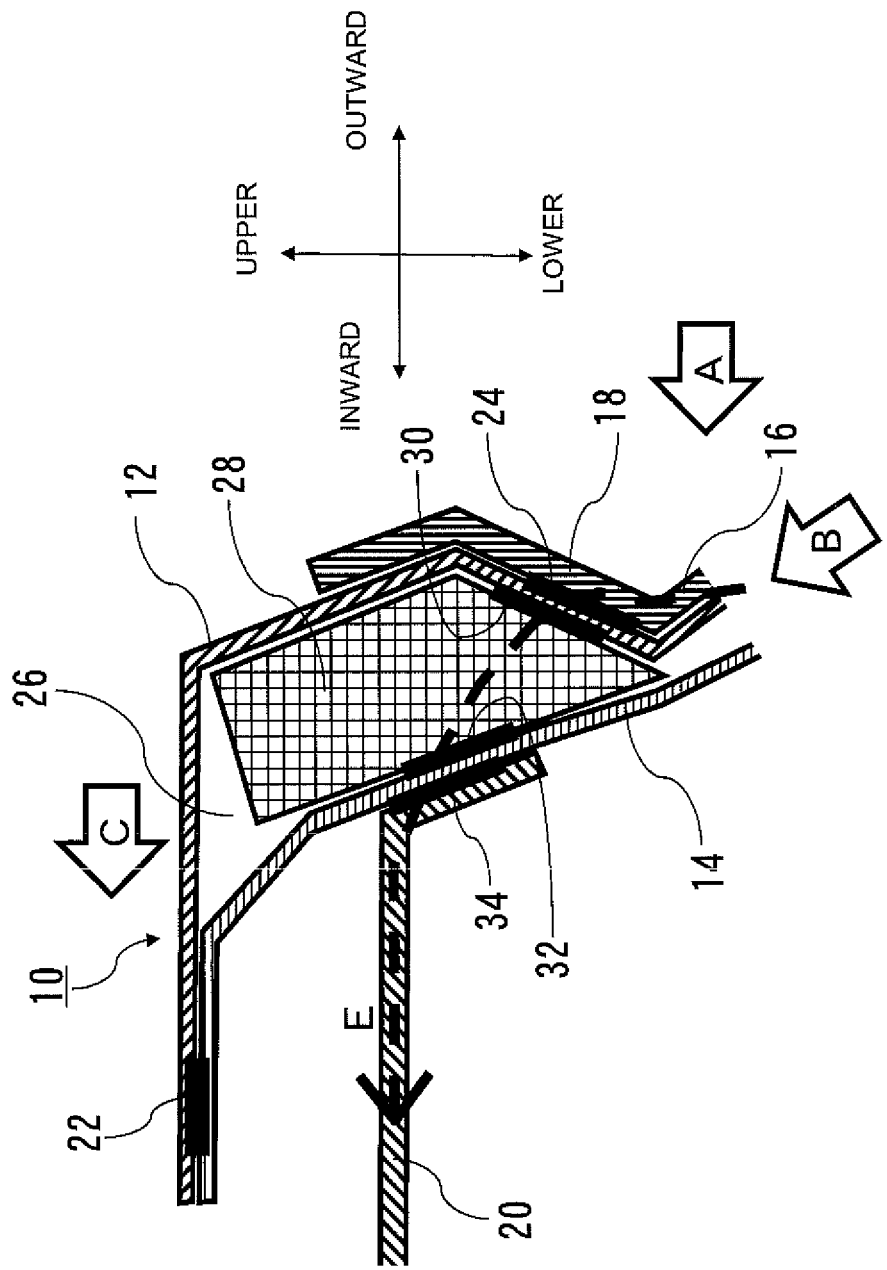
FIG. 4 is a cross sectional view of a pillar upper structure according to a first embodiment.

Referring to FIG. 4, the pillar upper structure according to a first embodiment will be described. In FIG. 4, elements similar to those in the related art pillar upper structure described above with reference to FIGS. 1 to 3 are designated by similar reference numerals and will not be described.

In FIG. 4, the roof side rail outer member 12 and the roof side rail inner member 14 of the roof side rail 10 are coupled together at least in the first coupling portion 22 in respective upper end portions. Alternatively, the roof side rail outer member 12 and the roof side rail inner member 14 may be coupled together not only in the first coupling portion 22 in their end portions but also in their lower end portions to thereby form a closed space 26.

The center pillar 16 supports, at its upper end portion 18, the roof side rail outer member 12 from below in a manner that an inward face of the center pillar 16 in the vehicle width direction and an outward face of the roof side rail outer member 12 in the vehicle width direction are coupled in the second coupling portion 24.

The space 26 formed by the roof side rail outer member 12 and the roof side rail inner member 14 houses a bulkhead 28 serving as a reinforcement. An outward face of the bulkhead 28 in the vehicle width direction is coupled with an inward face of the roof side rail outer member 12 in the vehicle width direction in a third coupling portion 30. An inward face of the bulkhead 28 in the vehicle width direction is coupled to an outward face of the roof side rail inner member 14 in the vehicle width direction in a fourth coupling portion 32. The third coupling portion 30 is located in a position on the inward face of the roof side rail outer member 12 in the vehicle width direction that corresponds to the position of the second coupling portion 24 on the outward face of the roof side rail outer member 12 in the vehicle width direction.

The bulkhead 28 may have a shape that fills the whole space 26 from the upper end to the lower end in FIG. 4 or a shape that leaves a portion (e.g., an upper end) of the space 26 vacant, as illustrated in FIG. 4. The bulkhead 28 increases rigidity of the roof side rail 10 to prevent breaking of the roof side rail 10.

The bulkhead 28 may be made of a rigid body such as aluminum or steel through the present specification.

The roof side reinforcement 20 has one end in the vehicle width direction whose outward face is coupled to the inward face of the roof side rail inner member 14 in the vehicle width direction at the fifth coupling portion 34 which is formed further below the first coupling portion 22. The fifth coupling portion 34 is located in a position on the inward face of the roof side rail inner member 14 in the vehicle width direction corresponding to the position of the fourth coupling portion 32 on the outward face of the roof side rail inner member 14 in the vehicle width direction.

In the present specification, the term "couple" refers to not only a structure in which members are physically or chemically coupled but also a structure in which members are normally spaced from or contiguous to each other, but are urged against each other when the vehicle body is impacted with external impulsive force.

Referring to FIG. 4, when a lateral side of the vehicle body is impacted with external impulsive force, the second coupling portion 24, the third coupling portion 30, the fourth coupling portion 32, and the fifth coupling portion 34 form a route indicated by dotted line arrow E along which the impulsive force is directed from the center pillar 16 toward the roof side reinforcement 20. Specifically, the external impulsive force in the direction of arrow A, which is exerted against the body lateral side, is transmitted along the center pillar 16 in the direction of arrow B, is thereafter transmitted from the second coupling portion 24 on the outward face of the center pillar 16 in the vehicle width direction to the third coupling portion 30 on the opposite face of the roof side rail outer member 12, and is then transmitted from the third coupling portion 30 toward the inside of the bulkhead 28 in the direction of dotted line arrow E. The impulsive force is further transmitted from the bulkhead 28 to the fourth coupling portion 32 on the outward face of the roof side rail inner member 14 in the vehicle width direction, is transmitted further from the fourth coupling portion 32 to the fifth coupling portion 34 on the opposite face of the roof side rail inner member 14, and is then transmitted to the roof side reinforcement 20 in the direction of dotted line arrow E.

The dotted line arrow E may form the shortest route from the center pillar 16 toward the roof side reinforcement 20.

This structure allows the impulsive force exerted against the lateral side of the vehicle body from outside of the vehicle body in the direction of arrow A to be guided through the bulkhead 28 to the roof side reinforcement 20 in the direction of dotted line arrow E. This reduces the impulsive force transmitted toward the arrow C through the roof side rail outer member 12, and thus finally reduces the impulsive force to be exerted onto the first coupling portion 22 where the roof side rail outer member 12 and the roof side rail inner member 14 are coupled together. Consequently, breaking of the roof side rail inner member 14 in the first coupling portion 22 can be avoided, so that deformation of the roof side rail can be reduced.

Pillar Upper Structure of Second Embodiment

Figure 5:
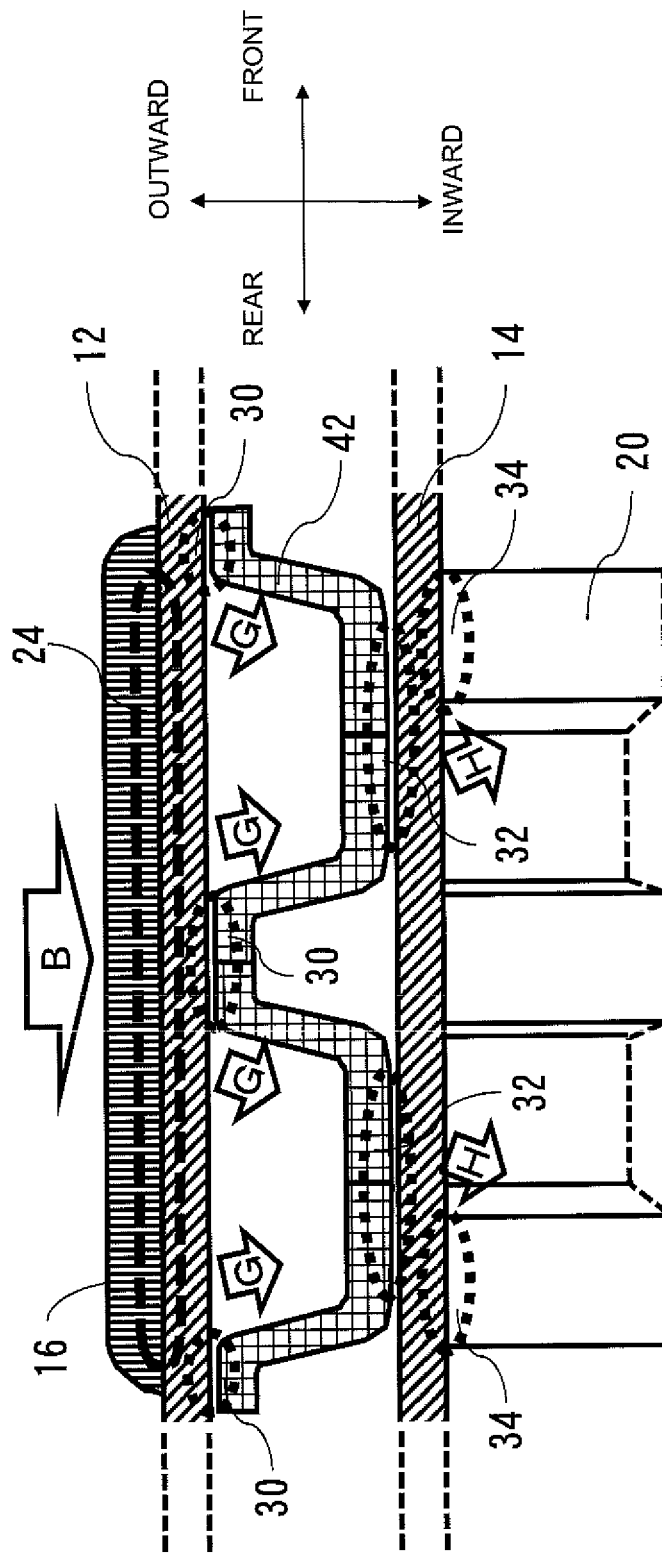
FIG. 5 is a cross sectional view of a pillar upper structure according to a second embodiment.

Referring now to FIG. 5, the pillar upper structure according to the second embodiment will be described. This pillar upper structure is characterized in the shape of a bulkhead 42. Specifically, the bulkhead 42 has an uneven shape with convex portions and concave portions in the vehicle body width direction, or a waveform shape, as illustrated in FIG. 5.

In FIG. 5, the center pillar 16 includes an inward face in the vehicle width direction which is coupled with the outward face of the roof side rail outer member 12 in the vehicle width direction in the second coupling portion 24. The bulkhead 42 includes an outward face in the vehicle width direction which is coupled with the inward face of the roof side rail outer member 12 in the vehicle width direction in the third coupling portions 30 in three locations. The bulkhead 42 further includes an inward face in the vehicle width direction which is coupled to the outward face of the roof side rail inner member 14 in the vehicle width direction in the fourth coupling portions 32 at two locations. During normal operations, the inward face of the bulkhead 42 and the outward face of the roof side rail inner member 14 may be spaced from each other in the fourth coupling portions 32 at the two locations.

As described above, the number of locations of the fourth coupling portion 32 may be smaller than the number of locations of the third coupling portion 30. This structure allows the impulsive force to be efficiently transmitted from the center pillar 16 to the roof side reinforcement 20 in a concentrated manner.

The roof side reinforcement 20 includes an outward face in the vehicle width direction at its one end, which is coupled to the inward face of the roof side rail inner member 14 in the vehicle width direction in the fifth coupling portions 34 at two or more locations.

The remaining portions of the structure are similar to those of the pillar upper structure according to the first embodiment.

In FIG. 5, the second coupling portion 24, the three third coupling portions 30, the two fourth coupling portions 32, and the two fifth coupling portions 34 form a route along which the external impulsive force exerted onto a lateral side of the vehicle body is further guided from the center pillar 16 toward the roof side reinforcement 20.

More specifically, when the external impulsive force is exerted against the lateral side of the vehicle body, the impulsive force is transmitted from the center pillar 16, and is transmitted, further through the center pillar 16 in the direction of arrow B, to the roof side rail outer member 12 in the second coupling portion 24. The impulsive force is then dispersed into the third coupling portions 30 at three locations, and is transmitted through the inside of the bulkhead 42 in the direction of arrow G. The impulsive force is further transmitted to the roof side rail inner member 14 in the fourth coupling portions 32 at two locations and in the fifth coupling portions 34 at two locations in this order, and is then transmitted to the roof side reinforcement 20.

The arrows B, G, and H may form the shortest route from the center pillar 16 toward the roof side reinforcement 20.

This structure allows the impulsive force caused by external impact exerted onto the lateral side on the vehicle body to be efficiently guided to the roof side reinforcement 20 through the bulkhead 42 in the direction of arrows B, G, and H.

Further, the impulsive force which is applied to the third coupling portions 30 in three locations is transmitted to the fourth coupling portions 32 at two locations and the fifth coupling portions 34 at two locations. This results in efficient and concentrated transmission of the impulsive force from the center pillar 16 to the roof side reinforcement 20.

This structure therefore reduces the impulsive force toward the direction of arrow C through the roof side rail outer member 12, thereby finally reducing the impulsive force applied to the first coupling portion 22 where the roof side rail outer member 12 and the roof side rail inner member 14 are coupled together, as described above with reference to FIG. 4. The structure thus avoids breaking of the roof side rail inner member 14 in the first coupling portion 22 and reduces deformation of the roof side rail.

Example Deformation of Pillar Upper Structure of Embodiments on Impact

Example deformation of the pillar upper structure of the embodiment caused by external impulsive force exerted against the vehicle body will be described.

Figure 6:
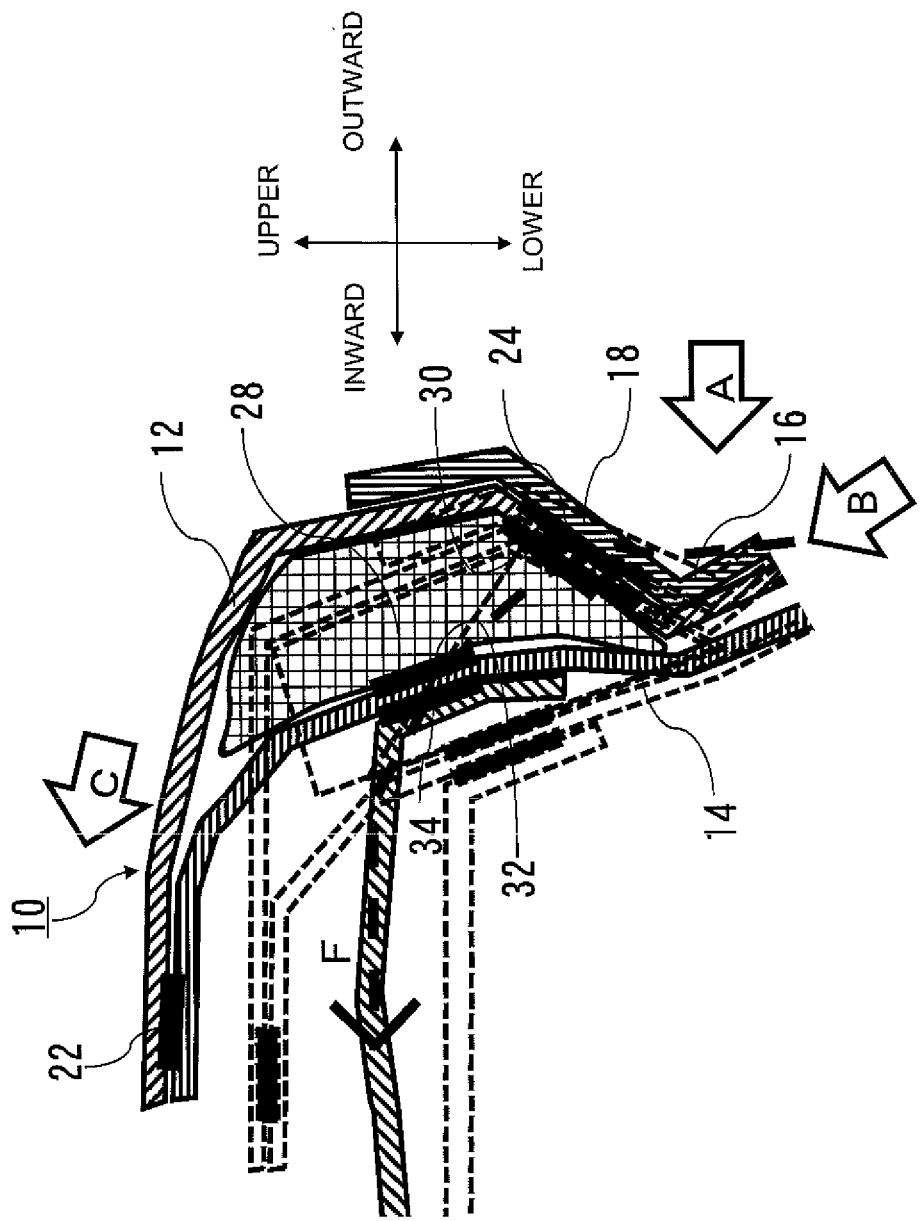
FIG. 6 illustrates example deformation of the pillar upper structure according to the embodiment caused by external impact on the pillar upper structure.

FIG. 6 illustrates example deformation of the pillar upper structure of the embodiments caused by external impulsive force exerted on the vehicle body, and more specifically illustrates example deformation of the pillar upper structure including the roof side rail 10 including the bulkhead 28 according to the first embodiment. The structure of the pillar upper structure illustrated in FIG. 6 is similar to that of the pillar upper structure in FIG. 4 and therefore will not be described.

In FIG. 6, portions indicated by dotted lines show the pillar upper structure during normal operations as illustrated in FIG. 4. Referring to FIG. 6, external impulsive force in the direction of arrow A exerted against the vehicle body is transmitted through the center pillar 16 in the direction of arrow B, is thereafter transmitted, via the second coupling portion 24 and the third coupling portion 30, through the bulkhead 28 in the direction of dotted line arrow F, and is further transmitted, via the fourth coupling portion 32 and the fifth coupling portion 34 in this order, in the direction of arrow F toward the roof side reinforcement 20.

Specifically, when the impulsive force is externally exerted against the vehicle body in the direction of arrow A, the force is transmitted within the center pillar 16 in the direction of arrow B, and is further transmitted to the roof side rail outer member 12, the bulkhead 42, the roof side rail inner member 14, and the roof side reinforcement 20 in the direction of dotted line arrow F.

While, at this time, the roof side reinforcement 20 generates repulsive force outwardly in the vehicle width direction against the force in the direction of dotted line F, the roof side rail inner member 14, whose outward side in the vehicle width direction is reinforced by the bulkhead 28, deforms only by a small amount.

This structure therefore inhibits transmission of the impulsive force in the direction of arrow C toward the first coupling portion 22 where the roof side rail outer member 12 and the roof side rail inner member 14 are coupled, to thereby avoid breaking in the first coupling portion 22, as illustrated in FIG. 6. Therefore, as illustrated in FIG. 6, while the roof side rail 10 as a whole slightly deforms outward of the vehicle body, breaking of the roof side rail inner member 14 in the first coupling portion 22 and cross-section crumbling of the roof side rail inner member 14 can be avoided, which further prevents significant deformation or destruction of the whole roof side rail 10 and the center pillar 16.

An experimental result shows that, when compared to the structure without the bulkhead as illustrated in FIG. 3, the yield strength of the roof side rail 10 having this structure is increased by approximately 18% and an amount of deformation outward of the vehicle body is reduced by 12 mm, which corresponds to a reduction in the door intrusion velocity by 0.05 m/s.

As described above, in an aspect of the disclosure, a pillar upper structure includes a roof side rail 10 extending along a length of a vehicle body on each end in a vehicle width direction of a body upper portion and including a roof side rail inner member 14 disposed inward in the vehicle width direction and a roof side rail outer member 12 disposed outward in the vehicle width direction, a center pillar 16 extending along a height of the vehicle body in each lateral side of the vehicle body, a bulkhead 28 disposed in a space formed by the roof side rail inner member 14 and the roof side rail outer member 12, and a roof side reinforcement 20. An upper end portion of the roof side rail inner member 14 and an upper end portion of the roof side rail outer member 12 are coupled with each other in a first coupling portion 22. The center pillar 16 is coupled with the roof side rail outer member 12 in a second coupling portion 24. The bulkhead 28 is coupled with the roof side rail outer member 12 in a third coupling portion 30 and coupled with the roof side rail inner member 14 in a fourth coupling portion 32. The roof side reinforcement 20 is coupled with the roof side rail inner member 14 in a fifth coupling portion 34 that is below the first coupling portion 22. The second coupling portion 24, the third coupling portion 30, the fourth coupling portion 32, and the fifth coupling portion 34 form a route along which impulsive force exerted to the center pillar 16 is transmitted to the roof side reinforcement 20.

The invention claimed is:

1. A pillar upper structure comprising:
a roof side rail extending along a length of a vehicle body on each end in a vehicle width direction of a body upper portion of a vehicle, the roof side rail comprising a roof side rail inner member disposed inward in the vehicle width direction and having an upper end portion and a roof side rail outer member disposed outward in the vehicle width direction and having an upper end portion, the upper end portion of the roof side rail inner member and the upper end portion of the roof side rail outer member being coupled with each other in a first coupling portion;
a center pillar extending along a height of the vehicle body in each lateral side of the vehicle body, an upper end portion of the center pillar being coupled with the roof side rail outer member in a second coupling portion;
a bulkhead disposed in a space formed by the roof side rail inner member and the roof side rail outer member adjacent to a location at which the upper end portion of the center pillar is coupled to the roof side rail outer member by the second coupling portion, the bulkhead being coupled with the roof side rail outer member in a third coupling portion and coupled with the roof side rail inner member in a fourth coupling portion; and
a roof side reinforcement coupled with the roof side rail inner member in a fifth coupling portion that is below the first coupling portion,
wherein the second coupling portion, the third coupling portion, the fourth coupling portion, and the fifth coupling portion form a route along which impulsive force exerted to the center pillar is transmitted to the roof side reinforcement.

2. The pillar upper structure according to claim 1, wherein the bulkhead has an uneven shape including concave portions and convex portions along the vehicle width direction or a waveform shape.

3. The pillar upper structure according to claim 1, wherein the bulkhead is coupled with the roof side rail outer member in the third coupling portion in a plurality of locations and coupled with the roof side rail inner member in the fourth coupling portion in a plurality of locations, and
a number of the locations of the fourth coupling portion is smaller than a number of the locations of the third coupling portion.

4. The pillar upper structure according to claim 2, wherein the bulkhead is coupled with the roof side rail outer member in the third coupling portion in a plurality of locations and coupled with the roof side rail inner member in the fourth coupling portion in a plurality of locations, and
a number of the locations of the fourth coupling portion is smaller than a number of the locations of the third coupling portion.

5. A pillar upper structure comprising:
a roof side rail extending along a length of a vehicle body on each end in a vehicle width direction of a body upper portion of a vehicle, the roof side rail comprising a roof side rail inner member disposed inward in the vehicle width direction and having an upper end portion and a roof side rail outer member disposed outward in the vehicle width direction and having an upper end portion, the upper end portion of the roof side rail inner member and the upper end portion of the roof side rail outer member being coupled with each other in a first coupling portion;

a center pillar extending along a height of the vehicle body in each lateral side of the vehicle body, the center pillar being coupled with the roof side rail outer member in a second coupling portion;

a bulkhead disposed in a space formed by the roof side rail inner member and the roof side rail outer member, the bulkhead being coupled with the roof side rail outer member in a third coupling portion and coupled with the roof side rail inner member in a fourth coupling portion; and a roof side reinforcement coupled with the roof side rail inner member in a fifth coupling portion that is below the first coupling portion, wherein the second coupling portion, the third coupling portion, the fourth coupling portion, and the fifth coupling portion form a route along which impulsive force exerted to the center pillar is transmitted to the roof side reinforcement, and the roof side reinforcement is disposed inward of the roof side rail inner member in the vehicle width direction.

6. The pillar upper structure according to claim 5, wherein the bulkhead has an uneven shape including concave portions and convex portions along the vehicle width direction or a waveform shape.

7. The pillar upper structure according to claim 5, wherein the bulkhead is coupled with the roof side rail outer member in the third coupling portion in a plurality of locations and coupled with the roof side rail inner member in the fourth coupling portion in a plurality of locations, and a number of the locations of the fourth coupling portion is smaller than a number of the locations of the third coupling portion.

8. The pillar upper structure according to claim 6, wherein the bulkhead is coupled with the roof side rail outer member in the third coupling portion in a plurality of locations and coupled with the roof side rail inner member in the fourth coupling portion in a plurality of locations, and a number of the locations of the fourth coupling portion is smaller than a number of the locations of the third coupling portion.

* * * * *